Patented Mar. 10, 1953

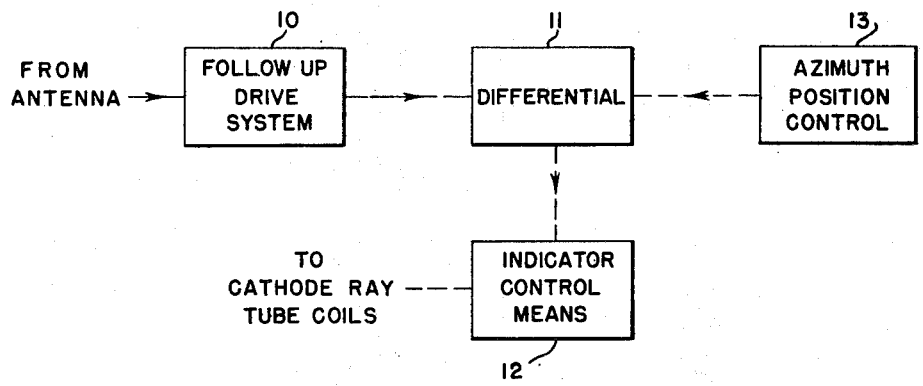

2,631,276

UNITED STATES PATENT OFFICE 2,631,276

RADIO DIRECTION FINDER

Leland J. Haworth, Belmont, Mass., assignor, by mesne assignments, to the United States of America as represented by the Secretary of War Application July 9, 1945, Serial No. 604,039

1 Claim. (Cl. 343—5)

This invention relates in general to automatic position-indicating systems, and more particularly to such systems which may be applied to the trace on a cathode ray tube screen.

Under some conditions, it is desirable that the trace on the screen of a cathode ray tube automatically follow the rotation of an antenna mounted on an airplane or on a ship, and that the azimuth angle of the antenna from a given reference angle be known from the position of the trace on the cathode ray tube. Two types of cathode ray tube indication will be dealt with here.

The first type of indication, normally used on a magnetically-deflected tube, is one in which the spot is quiescently at the center of the screen, and sweeps outwardly from the center. In one embodiment of this device, rotation of the antenna causes the deflection coils of the cathode ray tube to rotate by means of a conventional follow-up (servo) system. Thus as the antenna rotates the trace on the screen rotates in unison.

Circuits may be arranged so that only a sector of the 360° rotation will be shown on the screen. This will be called sector scan.

The second type of indication is one in which the azimuth direction of the antenna is displayed on the screen by the normal displacement of the trace from a reference zero line. In this case, the rotation of the antenna causes the sweep, which is always parallel to the reference zero line, to move across the screen in a direction normal to the reference line.

It is desirable that these types of indication have some means of automatically indicating a northward direction of the antenna. A comparatively simple way of accomplishing this is to continually position the magnetic deflection coils in such a direction that a desired point on the cathode ray tube is caused to represent north. That is, when the trace on the screen points towards this part of the tube, the antenna is pointing north.

Among the objects of this invention, therefore, are:

1. To provide a means of causing the northward direction to be recognized on the face of a cathode ray tube.

2. To provide such a means wherein such action is automatic.

In accordance with the present invention there is provided a system in which a cathode ray tube gives an indication of signals impinging on a rotatable antenna. The rotation of the antenna is made to control a follow-up drive (servo) system which controls the rotation or motion of the trace on the cathode ray tube. In an embodiment which may be used with either the aforementioned first or second type of indication, a compass is caused to partially control the angular output of a differential in the follow-up system.

This invention will best be understood by reference to the drawing, in which the figure is a block diagram of pertinent components of the system.

Referring now to the description of the apparatus, and to the figure, the antenna is caused to control a follow up (servo) drive system 10 by means well known in the art. The output shaft of follow-up system 10 is thus made to rotate in accordance with the rotation of the antenna. This shaft feeds through a differential gearing system 11 into an indicator control means 12. An azimuth position control 13 also controls the output angle of shaft from the differential 11. The indicator control means 12 may be a selsyn or similar apparatus, and is electrically connected to a similar selsyn mechanically connected to the deflection coils of the cathode ray tube. The differential 11 may be positioned either on the antenna side of the selsyn or on the cathode ray tube side.

Referring now to the operation of the first embodiment of the apparatus and to the figure, it is seen that as the antenna rotates, the amount of this rotation will show up on the output shaft of the follow-up drive system 10. This motion will then feed through the differential 11 to indicator control means 12. If this means 12 is a selsyn, it is electrically connected to another selsyn mechanically connected to the deflection coils of a cathode ray tube, and so this motion will be transmitted to the coils. The initial position of the antenna with respect to the cathode ray tube coils is chosen so that the direction of north will be indicated towards the top of the tube, or any other desired direction. The turning of the airplane or ship will cause the compass to turn the position control 13 so that north remains in the original direction. This can be done by mounting the coils on a rotatable yoke and driving the yoke by the indicator control means shaft. This arrangement may be used in connection with either the aforementioned first or second type of indication.

While there has been described what is at present considered the preferred embodiment of the invention, it will be obvious to those skilled in the art that various changes and modifications may be made therein without departing from the invention.

I claim:

In a radio direction-finding system for use on a moving vehicle employing a rotating directional antenna and a cathode ray indicating tube having beam deflecting means associated therewith, differential gearing means having a first and a second input shafts and a control shaft, a follow-up drive system controlled by said rotating antenna and operatively connected to said first input shaft, azimuth position control means operatively connected to said second input shaft, and means connecting said control shaft and said deflecting means to cause said deflecting means to deflect said beam in a direction jointly determined by the angular position of said rotating antenna and the angular position of said azimuth position control means.

LELAND J. HAWORTH.

REFERENCES CITED

The following references are of record in the file of this patent:

UNITED STATES PATENTS

| Number | Name | Date |
|---|---|---|
| 1,715,270 | Bassett | May 28, 1929 |
| 1,958,259 | Becker | May 8, 1934 |
| 2,127,415 | Marique | Aug. 16, 1938 |
| 2,209,191 | Dearing | July 23, 1940 |
| 2,296,041 | Luck | Sept. 15, 1942 |
| 2,299,083 | Elm | Oct. 20, 1942 |
| 2,308,936 | Schuchardt et al. | Jan. 19, 1943 |
| 2,361,956 | Moseley | Nov. 7, 1944 |
| 2,408,848 | Hammond | Oct. 8, 1946 |

FOREIGN PATENTS

| Number | Country | Date |
|---|---|---|
| 494,263 | Great Britain | Oct. 24, 1938 |